(12) United States Patent
Deshmukh et al.

(10) Patent No.: US 11,751,119 B2
(45) Date of Patent: Sep. 5, 2023

(54) METHODS AND SYSTEMS FOR ROUTING DATA THROUGH IAB NODES IN 5G COMMUNICATION NETWORKS

(71) Applicant: SAMSUNG ELECTRONICS CO., LTD., Suwon-si (KR)

(72) Inventors: Aneesh Deshmukh, Bangalore (IN); Neha Sharma, Bangalore (IN); Pravjyot Singh Deogun, Bangalore (IN); Fasil Abdul Latheef, Bangalore (IN); Shouvik Guha, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 17/053,910

(22) PCT Filed: May 9, 2019

(86) PCT No.: PCT/KR2019/005572
§ 371 (c)(1),
(2) Date: Nov. 9, 2020

(87) PCT Pub. No.: WO2019/216670
PCT Pub. Date: Nov. 14, 2019

(65) Prior Publication Data
US 2021/0243672 A1 Aug. 5, 2021

(30) Foreign Application Priority Data

May 9, 2018 (IN) .............................. 201841017524
May 7, 2019 (IN) .............................. 201841017524

(51) Int. Cl.
*H04W 40/22* (2009.01)
*H04W 28/02* (2009.01)
(Continued)

(52) U.S. Cl.
CPC ....... *H04W 40/22* (2013.01); *H04W 28/0268* (2013.01); *H04W 40/12* (2013.01); *H04W 40/248* (2013.01); *H04W 88/14* (2013.01)

(58) Field of Classification Search
None
See application file for complete search history.

(56) References Cited

U.S. PATENT DOCUMENTS

| 2019/0159277 A1* | 5/2019 | Zhu | H04W 92/12 |
| 2019/0313469 A1* | 10/2019 | Karampatsis | H04W 48/18 |
| 2021/0127430 A1* | 4/2021 | Teyeb | H04L 67/141 |

FOREIGN PATENT DOCUMENTS

| KR | 10-2019-0034094 A | 4/2019 | |
| WO | 2017196249 A1 | 11/2017 | |
| WO | WO-2019194737 A1 * | 10/2019 | ........... H04L 67/141 |

OTHER PUBLICATIONS

Communication dated Jan. 14, 2022, issued by the European Patent Office in counterpart European Application No. 19800692.6.
(Continued)

*Primary Examiner* — Brian S Roberts
(74) *Attorney, Agent, or Firm* — Sughrue Mion, PLLC

(57) ABSTRACT

Methods and systems for routing data through IAB nodes 201, 202 in 5G communication networks. Embodiments herein allow routing data between a UE 206 and an IAB donor 200 though IAB nodes 201, 202 using adaptation layers of the IAB donor 200 and the IAB nodes 201, 202. The adaptation layers of the IAB donor 200 and the IAB nodes 201, 202 are configured by defining adaptation layer header and functionality. Mapping is performed between bearers/RLC channels of the UE 206 and the IAB node 202 and between bearers/RLC channels of the IAB nodes 201, 202 and the IAB donor 200. The means to perform the mapping is specified by the adaptation layers of either the IAB donor 200 or the IAB nodes 201, 202. The data is routed
(Continued)

through the bearers/RLC channels. The embodiments include managing RLC layer functionality using either hop-by-hop ARQ or end-to-end ARQ.

16 Claims, 13 Drawing Sheets

(51) Int. Cl.
*H04W 40/12* (2009.01)
*H04W 40/24* (2009.01)
*H04W 88/14* (2009.01)

(56) References Cited

OTHER PUBLICATIONS

ZTE "Discussion on IAB architectures," R3-181829, 3GPP TSG-RAN WG3 Meeting #99bis, Apr. 15, 2018, Total 9 pages.
Qualcomm Incorporated (Rapporteur), "IAB U-plane considerations for architecture group 1," R2-1806455, 3GPP TSG-RAN WG2 Meeting #101 bis, Apr. 28, 2018, Total 4 pages.
Qualcomm Incorporated, "IAB—U-plane transport for L2-relaying," R3-181945, 3GPP TSG-RAN WG3 Meeting #99bis, Apr. 15, 2018, Total 8 pages.
KDDI Corporation et al. "Consideration on IAB node discovery and connection establishment" Discussion and decision, 3GPP TSG RAN WG2 #101 bis, Sanya, China, Apr. 16-20, 2018, R2-1804527, (5 pages total).
Samsung Electronics R&D Institute UK "Adaptation layer: position in the protocol stack and location within the IAB donor node" Discussion, 3GPP TSG-RAN WG2 #101-bis, Sanya, China, Apr. 16-20, 2018, R2-1804700 (6 pages total).
Intel Corporation "Adaptation layer and Routing for IAB in NR" Discussion and Decision, 3GPP TSG RAN WG2 Meeting #101 bis, Sanya, China, Apr. 16-20, 2018, R2-1805685 (8 pages total).
Nokia et al. "Architecture and Protocols: MAC adaptation layer based IAB" Discussion and Decision, 3GPP TSG-RAN WG2 Meeting #101 bis, Sanya, China, Apr. 16-20, 2018, R2-1805701 Update of R2-1800392, (8 pages total).
International Search Report (PCT/ISA/210), issued by International Searching Authority in corresponding International Application No. PCT/KR2019/005572, dated Aug. 14, 2019.
Written Opinion (PCT/ISA/237) issued by the International Searching Authority in corresponding International Application No. PCT/KR2019/005572, dated Aug. 14, 2019.

* cited by examiner

METHODS AND SYSTEMS FOR ROUTING DATA THROUGH IAB NODES IN 5G COMMUNICATION NETWORKS

CROSS-REFERENCE TO RELATED APPLICATION(S)

This application is a National Phase Entry of PCT International Application No. PCT/KR2019/005572, which was filed on May 9, 2019, and claims priority to Indian Provisional Patent Application No. 201841017524 filed on May 9, 2018, and Indian Complete Patent Application No. 201841017524 filed on May 7, 2019, in the Indian Intellectual Property Office, the content of each of which are incorporated herein by reference.

BACKGROUND

1. Field

Embodiments herein relate to Integrated Access and Backhaul (IAB) in 5th Generation (5G) communication networks, and more particularly to methods and systems for configuring the adaptation layer for IAB donor and IAB nodes in a 5G communication network.

2. Description of the Related Art

5G New Radio (NR) cells may be deployed in a varying range of carrier frequencies. The ranges of the frequencies can be broadly divided into a frequency range 1, for cells deployed in carrier frequencies less than 6 GHz; and a frequency range 2 for cells deployed in carrier frequencies greater than 6 GHz. At higher carrier frequencies (greater than 6 GHz), the coverage area of a cell can be relatively small. The deployment of NR cells (which operate in millimeter waves) leads to a telecommunication ecosystem, wherein cells with a small coverage area are densely deployed.

In such deployments, having independent backhaul connectivity for each of the deployed cells or Random Access Network (RAN) nodes can lead to a complex and expensive topology. As a result, it is recommended to have an ecosystem, wherein only a few of the RAN nodes are having direct backhaul connectivity. The RAN nodes not having backhaul connectivity can route their traffic to the core network directly or to the core network through the RAN nodes having backhaul connectivity. The RAN nodes without backhaul connectivity can serve as relay nodes, wherein data is relayed on to other RAN nodes which have backhaul connectivity. In NR, such relay nodes can be referred to as Integrated Access Backhaul (IAB) nodes.

The IAB nodes enable flexible and dense deployment of NR cells without a proportionate increase in the density of the transport network. A diverse range of deployment scenarios can be envisioned including support for outdoor small cell deployments, indoors, or even mobile relays (e.g. on buses or trains). IAB nodes can support access and backhaul in the above-6 GHz- and sub-6 GHz spectrums.

FIG. 1 illustrates a 5G communication network, wherein NR User Equipments (UEs) are connected to an IAB donor through IAB nodes. The UEs can be connected to the IAB donor either directly or using single/multiple hops. The NR UEs can transparently connect to an IAB node using NR. Long Term Evolution (LTE) UEs can transparently connect to an IAB-node using LTE, if the IAB node supports backhauling of LTE access. The NR supports multi-hop backhauling, which can enable range extension. The multi-hop backhauling involves relay of data generated by the UE or NR Core Network (NGC) through a plurality of IAB nodes. Multi-hop backhauling can be beneficial for cells using carrier frequencies above 6 GHz, with a limited coverage area. Multi-hop backhauling further enables backhauling around obstacles; for example, buildings in urban environment for in-clutter deployments. The maximum number of hops in a deployment can depend on multiple factors such as frequency, cell density, propagation environment, traffic load, and so on. These factors are further expected to change over time. From the architectural perspective, flexibility in hop count is, therefore, desirable.

As depicted in FIG. 1, the 5G network supporting multi-hop backhauling between the IAB nodes includes a UE, wherein the UE is connected to an IAB donor through at least one IAB node. There is backhaul connectivity between the IAB nodes and between the IAB nodes and the IAB donor. The 5G network facilitates a multi-hop environment, wherein data from an IAB node is relayed over multiple other IAB nodes, prior to arriving at the IAB donor (Donor Next Generation Node B (gNB) (DgNB)).

The IAB nodes can support gNB functionality and terminate the radio protocols of the NR radio interface, and the Next Generation (NG) and Xn (such as X2) interfaces. In addition to the gNB functionality, the IAB nodes can also support a subset of the UE functionality, e.g. physical layer, layer-2, RRC, and Non-Access Stratum (NAS) functionality, in order to wirelessly connect to the DgNB. The IAB nodes may also support the DU functionality by terminating the radio protocols of the NR radio interface, and the F1 interfaces.

SUMMARY

The principal object of the embodiments herein is to disclose methods and systems for configuring an adaptation layer of an Integrated Access and Backhaul (IAB) donor and adaptation layers of IAB nodes in $5^{th}$ Generation (5G) communication networks.

Another object of the embodiments herein is to define contents and functionalities of the adaptation layers of the IAB donor and the IAB nodes for configuring and terminating the adaptation layers.

Another object of the embodiments herein is to manage a mapping between User Equipment (UE) bearers and IAB node bearers, between IAB node bearers, and between IAB node bearers and the IAB donor bearers.

Another object of the embodiments herein is to manage a mapping between Radio Link Control (RLC) channels of the IAB donor and the IAB nodes.

Another object of the embodiments herein is to manage RLC layer functionality using hop-by-hop Automatic Repeat Request (ARQ) and end-to-end ARQ.

Accordingly, the embodiments provide methods and systems for routing data between a User Equipment (UE) and an Integrated Access and Backhaul (IAB) donor and IAB nodes in 5th Generation (5G) communication networks using adaptation layers of the IAB donor and intermediate IAB nodes. The embodiments include configuring the adaptation layers of the IAB donor and the IAB nodes. The embodiments include defining content and functionality of the adaptation layers of the IAB donor and the IAB nodes. The embodiments include mapping between bearers/RLC channels of the UE and IAB nodes and between bearers/RLC channels of the IAB nodes and the IAB donor, wherein method adopted to perform the mapping can be specified by the adaptation layers of either the IAB donor or the IAB nodes. The embodiments include routing the data through the bearers/RLC channels. The embodiments include managing RLC layer functionality using either hop-by-hop Automatic Repeat Request (ARQ) or end-to-end ARQ.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Embodiments herein are illustrated in the accompanying drawings, through out which like reference letters indicate corresponding parts in the various figures. The embodiments herein will be better understood from the following description with reference to the drawings, in which.

DETAILED DESCRIPTION

Figure 1:
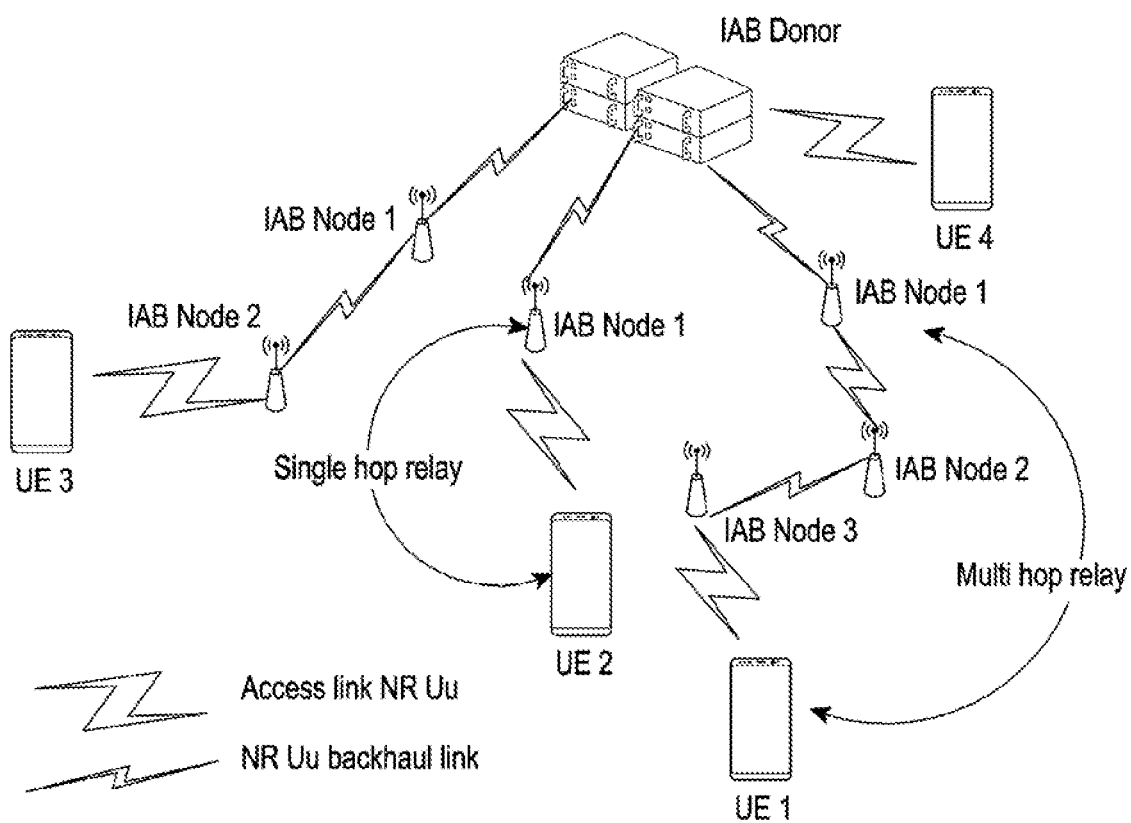
FIG. 1 illustrates a 5G communication network, wherein New Radio (NR) User Equipments (UEs) are connected to an Integrated Access and Backhaul (IAB) donor through IAB nodes.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for configuring adaptation layer of an Integrated Access and Backhaul (IAB) donor and IAB nodes in Fifth Generation (5G) communication networks.

Each of the IAB nodes can include a Distributed Unit (DU). The IAB donor can include a DU and a Central Unit (CU). The IAB nodes and the IAB donor can include respective adaptation layers that can be configured to perform functions relevant to routing of data from/to User Equipments (UEs) connected to the DUs of the IAB nodes and the IAB donor; and forwarding data of the UEs through IAB nodes, if the UE is connected to the IAB donor in one or more hops. Each IAB node can be identified by a unique DU Identity (ID), wherein the IAB node can use the DU ID for interfacing the IAB nodes to the CU for performing Control Plane (CP) and User Plane (UP) functionalities. The IAB node can connect to the CU using at least one of a F1-AP or F1*-AP interface for exchanging CP messages. The IAB nodes can connect to the DU of the IAB donor using at least one of a F1-U or F1*-U interface for exchanging UP data. The F1-U or F1*-U interface can be established during the IAB node establishment procedure. The IAB nodes can be identified using their DU ID for all classifications. Each IAB node F1-U or F1*-U can be identified by using individual General Packet Radio Service (GPRS)

Tunneling Protocol (GTP)-U tunnel endpoint identifiers such as an Internet Protocol (IP) address. The adaptation layer allows mapping of data from various streams (bearers) through IAB nodes.

For sending CP messages in downlink, the CU can forward the CP messages to the DU of the IAB donor over the F1*-AP interface between the CU and the DU of the IAB donor. Consider that the CP messages are to be sent to a UE through IAB nodes to a DU of an IAB node connected to the UE. Each of the IAB nodes includes a DU ID. The CU can include the DU ID of an IAB node (acting as a relay node), connected to the DU of the IAB donor, in the F1*-AP header. The DU of the IAB donor can receive the CP messages along with the F1*-AP header. The DU of the IAB donor can parse the F1*-AP header and identify that the CP message is to be forwarded over New Radio (NR) backhaul link towards the IAB node acting as a relay. The adaptation layer in the DU of the IAB donor can further encapsulate the CP message and include an adaptation layer (which can include the DU ID of the IAB node acting as a relay) on top of the F1*-AP message and forward the F1*-AP message to the IAB node (acting as a relay) using a protocol stack at the DU of the IAB donor.

The adaptation layer message can be forwarded using SRBs between IAB nodes if SRBs are configured between the IAB nodes, and between the IAB nodes and the IAB donor. Based on the reception of the adaptation layer message (packet) over a NR backhaul link by the subsequent IAB node, the IAB node can determine whether to forward the packet to the subsequent IAB node or identify the packet as meant for its DU based on information (destination or recipient DU ID) present in the adaptation header.

If SRBs between UEs and IAB nodes, between IAB nodes, and between IAB nodes and IAB donor are not supported, then the CP message can be forwarded to the subsequent IAB node over a DRB, wherein the DRB used for forwarding can have the highest priority amongst other DRBs between the IAB nodes. The F1*-AP message can be processed as a payload. Based on the information such as destination DU ID in the adaptation layer header, the CP message can be forwarded to the subsequent IAB node or terminated at the recipients IAB node.

For transfer of a CP message in uplink, a Radio Resource Control (RRC) message can be generated from a UE and sent to the DU of an IAB node connected to the UE using a NR access link. The DU of the IAB node can forward the CP message to the CU by mapping the CP message either over the SRB or a special DRB. The adaptation layer header can ensure that the IAB node is able to guarantee the required QoS for the CP (RRC) message packet in the special DRB. When the CP message is received at a UP interface of the DU of the IAB donor, the adaptation layer can map the UP message from the F1*-U to F1*-AP interface for routing the CP packet to the CU. The CU can process the CP message (as if it is) received from the UE.

For UP data in downlink, received over the F1*-U interface between the CU and the DU of the IAB donor, the UP data can be forwarded by the DU of the IAB donor based on the GTP-U ID. The UP data can be encapsulated with an adaptation layer header and then mapped to a DRB established between the DU of the IAB donor and the IAB nodes. On reception of the UP data at an IAB node, the information in the header of the adaptation layer enables the IAB node to route the received UP data packets to subsequent IAB nodes or forward the UP data packets to a particular UE connected to the IAB node.

For UP data received in uplink from a UE connected to an IAB node, the IAB node can processes the UP data and forward the UP data to subsequent IAB nodes. In an embodiment, a GTP-U packet can be prepared at the IAB Node DU and forwarded over the subsequent IAB links as simple payload. In an embodiment, the GTP-U packet can be prepared at the DU of the IAB donor. The IAB node can encapsulate the UP data using an adaptation layer header and forwards the adaptation layer packet to a subsequent IAB node. The IAB nodes that receive the adaptation layer packet from other IAB nodes in the uplink, can forward the adaptation layer packet to the subsequent IAB nodes. When the DU of the IAB donor receives the adaptation layer packet, the DU can route the packet over the F1*-U interface with the CU.

The header of the adaptation layer can be configured with information such as, but not limited to, UE ID, DRB ID, destination DU ID, source DU ID, path/route ID (if route is configurable), QFI (for QoS requirement), indication of SRB/Dedicated Radio Bearer (DRB), and so on. As all uplink data is to be routed to the DU of the IAB donor, the uplink adaptation layer header can be simplified.

As the IAB nodes may need to route a large number of data streams, the embodiments herein disclose assigning priorities amongst the data streams for managing routing decisions. The priorities can be assigned, if the amount of available resources over the backhaul links between the IAB nodes is limited.

As the number of UEs connected to an IAB node can be more than the number of DRBs available at the IAB node, the embodiments herein disclose scheduling the routing of data of different UEs by mapping DRBs of the UEs with the DRBs of the IAB nodes and DRBs of the UEs with the DRBs of the IAB donor. Independent of the method adopted to perform bearer mapping, the adaptation layer can include information about QoS requirement of different UE DRBs as QoS Flow ID (QFI) value, in order to schedule the data of the UEs on subsequent backhaul links.

For satisfying the QoS requirements of data of the UEs in UE DRBs, suitable methods such as one-to-one mapping (A UE DRB can be mapped with a IAB node DRB, i.e., when a DRB is established at a UE, a corresponding DRB is also established over all the IAB links supporting that UE), QoS mapping (An IAB node, connected to the UE, maps UE DRBs with similar QoS requirements to an IAB DRB by multiplexing data in the UE DRBs with similar QoS requirements over a single IAB DRB), and mapping UE DRBs with preconfigured IAB node DRBs can be used for supporting the QoS requirements.

The adaptation layer header can include the QoS requirement information for UP and CP data that is to be forwarded over the IAB NR access and backhaul links. In an embodiment, the QoS requirement information can be included in the routing information available at each of the IAB nodes. For transfer of UP and CP data in downlink, the adaptation layer at the IAB donor can update a field indicating the QoS requirement for each UP and CP data packet. For routing data in uplink, the adaptation layer header can be prepared at the IAB node (to which UE is connected to), and the QoS requirement can be updated by the same IAB node.

The adaptation layer of the IAB nodes can be placed above the Radio Link Control (RLC) or Medium Access Control (MAC) layers. It is necessary to provide RLC functionalities such as Automatic Repeat Request (ARQ) and segmentation as per the NR release-15 specification. In a standard RLC deployment, the RLC layer can deliver data directly to Packet Data Convergence Protocol (PDCP) layer.

However, as the adaptation layer is responsible for managing the routing and scheduling functionalities, the RLC layer can deliver the data to the adaptation layer, which is further forwarded to other IAB node using subsequent hops.

The point of termination of the CP/UP data, forwarded across the IAB nodes, can be either at a UE or a Next Generation Node B (gNB). In an embodiment herein, the IAB node may support full protocol stack functionality. In an embodiment herein, the IAB node may not support full protocol stack functionality. As intermediate IAB nodes (from the perspective of a UE connected to an IAB node) are connected to each other using NR backhaul links, it may not be possible to guarantee the best possible conditions at the backhaul links. Also, based on the number of UEs connected to a particular IAB node, it may also not be possible to schedule transfer of data to a subsequent IAB node due to congestion. Therefore, RLC segmentation may/may not be supported between the IAB nodes.

ARQ between a UE and a DU can be supported using hop-by-hop ARQ (between the UE and the IAB nodes, between the IAB nodes, and between the IAB node and the IAB donor), and end-to-end ARQ (between the UE and the DU of the IAB donor).

When the connection between a UE and the Next Generation Core (NGC) is established through a plurality of IAB nodes over NR Backhaul, the expected latency may not be achieved. In case of end-to-end ARQ, the latency can be low. If there is data loss at any of the backhaul links, there can be redundant retransmissions over all backhaul links in order to recover the data. As the ARQ is performed between RLC entities of the UE and IAB donor DU, the RLC entities of the intermediate IAB nodes may use the same procedure for performing RLC Segmentation and Sequence Number (SN) assignment as the UE and the IAB donor.

If end-to-end ARQ is supported, then the adaptation layer can maintain mapping between an original RLC SN to a new RLC SN and process ARQ feedback from a UE to the IAB donor DU. The adaptation layer can request for the retransmissions of actual RLC Protocol Data Units (PDUs) or segment PDUs from the IAB donor DU. If there are multiple hops involved between the UE and the IAB donor, the embodiments herein disclose minimizing latency by preventing redundant retransmission, if the RLC PDUs are received correctly till a particular IAB node. In such a case, retransmissions from the Donor DU can be avoided. In such scenarios, the RLC PDUs for all the UEs may be buffered at each IAB node, and acknowledgements from all UEs may be relayed for each hop.

If hop-by-hop ARQ is supported, then the intermediate IAB nodes can follow RLC functionalities and RLC SN assignment independently. There RLC entities of the IAB nodes may not have information of the RLC mapping of the previous and subsequent IAB nodes or the IAB donor. The ARQ and data recovery can be performed at each hop independently. The data (RLC PDUs) forwarded by an IAB node is stored in a buffer until the RLC entity of the subsequent IAB node acknowledges the reception of the data.

Referring now to the drawings, and more particularly to FIGS. 2a through 15, where similar reference characters denote corresponding features consistently throughout the figures, there are shown preferred embodiments.

Figure 2A:
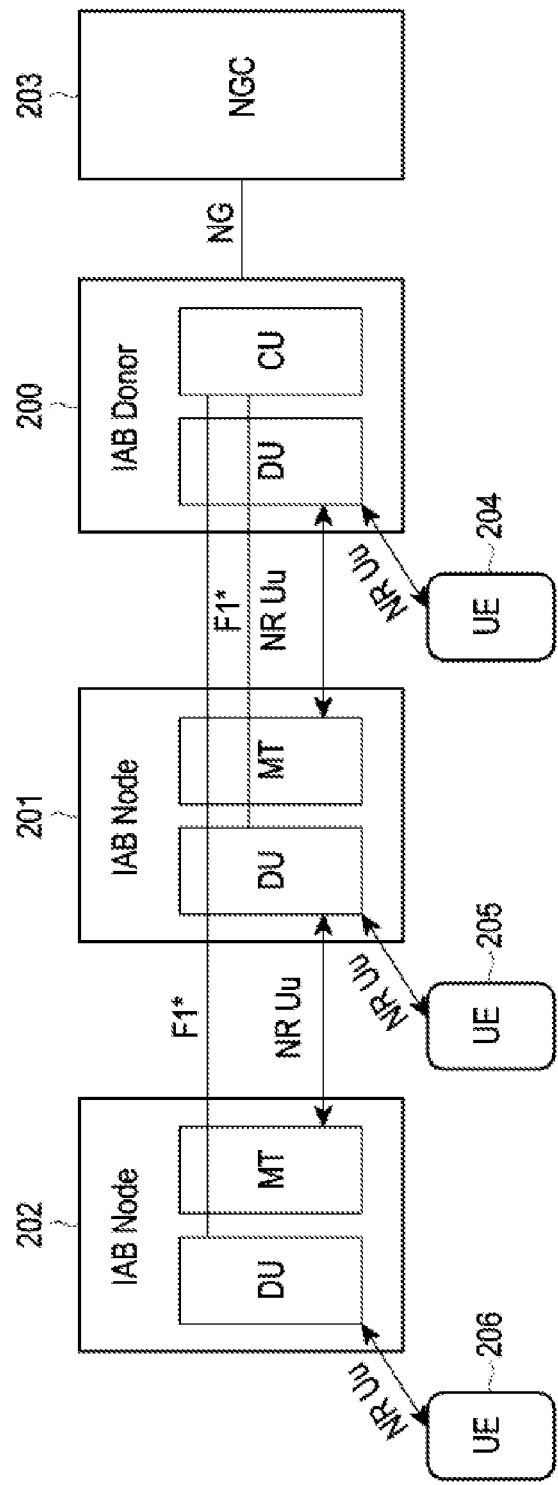
FIG. 2A illustrates a 5G network, wherein an IAB donor functions as a Next Generation Node B (gNB) having a split Central Unit (CU)-Distributed Unit (DU) architecture, according to embodiments as disclosed herein.

FIG. 2A illustrates a 5G network, wherein an IAB donor 200 functioning as gNB is having a split CU-DU architecture, according to embodiments as disclosed herein. The IAB-donor 200 can be considered as a Random Access Node (RAN) node, which can act as an interface between UEs (204, 205 and 206) and an NGC 203. The IAB donor 200 can provide wireless backhauling functionality to the IAB nodes 201, 202. The IAB nodes 201, 202 can be considered as RAN nodes sharing a wireless NR Uu access link with the UEs 205 and 206 respectively. The IAB nodes 201, 202 can also be considered as UEs that can relay NR access traffic across wireless NR Uu backhaul links with the IAB donor 200.

As depicted in FIG. 2A, the IAB node 202 can act as a UE for the IAB node 201, and the IAB node 201 can act as a UE for the IAB donor 200. The UE part of the IAB nodes 201, 202 can be referred to as Mobile Terminal (MT). The DUs of the IAB nodes 201, 202 can act as the RAN node. The IAB nodes 201, 202 act as RAN nodes to the UEs 205 and 206 respectively. As the IAB donor 200 is a gNB (as the IAB donor 200 includes both CU and DU), the UE 204 connected to the IAB donor 200 can be considered to be connected to the gNB. The IAB nodes 201, 202 can comprise the functionality and protocol stack of both a RAN node and a UE. The MT of the IAB node 202 can terminate the radio interface layers of the backhaul Uu interface toward the IAB node 201. The MT of the IAB node 201 can terminate the radio interface layers of the backhaul Uu interface toward the IAB donor 200.

The IAB nodes 201, 202 may function as a DU or have full gNB functionality. For the architecture depicted in FIG. 2B, the IAB nodes 201, 202 functions as DU only. The UEs in a NR network can communicate with the IAB donor 200 using either a single hop relay, a multiple hop relay, or directly. The UE 206 can communicate with the IAB donor 200 through one or more hops (through IAB nodes 202 and 201). The UE 205 can communicate with the IAB donor 200 through a single hop (through the IAB node 201). The UE 204 can communicate with the IAB donor 200 directly. The IAB nodes 201, 202 are connected to each other and with the IAB donor 200 through NR backhaul links. The IAB nodes 201, 202 can use the NR backhaul links to relay access traffic from multiple UEs 205, 206 connected to the IAB nodes 201, 202. The link between the UEs 205, 206 with the IAB nodes 201, 202 respectively, and the UE 204 and the IAB donor 200 are the NR access links.

The RRC and PDCP protocol stack are included in the CU. The RLC, MAC, physical layer (PHY) and Radio Frequency (RF) are located in the DUs of the IAB nodes 201, 202. The IAB donor 200 and the IAB nodes 201, 202 include an adaption layer. The adaptation layer of the IAB donor 200 can be included in either the DU or the CU. The adaptation layer can include information such as, but not limited to, UE ID, UE/IAB bearer ID, source DU ID (for uplink), destination DU ID (for downlink), path (route) ID (if the route is configurable), Quality of Service (QoS) information, indication for SRB and DRB, and so on.

The adaptation layer can manage routing and forwarding the data across the backhaul interfaces between the IAB nodes 201, 202, and between the IAB node 201 and the IAB donor 200. The adaptation layer in the IAB nodes 201, 202 and the IAB donor 200 can manage mapping between bearers/RLC channels of the individual UEs 205, 206 and particular IAB nodes 201, 202 connected to the UEs 205, 206, mapping between bearers/RLC channels of the IAB nodes 201, 202, mapping between bearers/RLC channels of the IAB node 201 and the IAB donor 200, and mapping between UP PDUs and backhaul RLC channels (RLC channel of the IAB nodes 201, 202, and the IAB donor 200). The adaptation layer can identify bearers belonging to a specific UE based on UE ID and UE bearer ID (included in the adaptation layer) for a particular PDU. The adaptation layer can include relevant QoS information for different services provided to the UEs (204, 205, 206). The adaptation layer can manage QoS enforcement on the downlink and the uplink on the NR backhaul link.

The IAB donor 200 can manage configuration and reconfiguration of the adaptation layer using the adaptation layer included in the CU, so that the adaptation layer is enabled to perform the designated functionalities. In an embodiment, the configuration of the adaptation layer involves configuring the header of the adaptation layer using information such as, but not limited to, mapping mechanism between the UE bearers/RLC channels, route ID and IAB node ID for a UE, Internet Protocol (IP address) of a UE (in case GTP-U is replaced), QoS information of a UE, UE context, and so on. If the adaptation layer is included in the DU of the IAB donor 200, the IAB nodes 201, 202 can manage the configuration and reconfiguration of the respective adaptation layers. The IAB donor 200 can share relevant information to the IAB nodes 201, 202 for configuring the respective adaptation layers.

The operation of DU of the IAB donor 200 can be controlled by the CU. The CU and DU have F1-AP and F1-U interfaces for communicating with each other. The F1-AP interface is used to share the CP information between the CU and the DU. The F1-U interface is used to share UP messages with the IAB nodes 201, 202. The DUs of the IAB nodes 201, 202 can be connected to the CU of the IAB donor 200 using a logical F1* interface. The IAB donor 200 can communicate relevant information pertaining to configuration of the adaptation layer, routing, and attach or detach of the UEs to the IAB nodes 201, 202; using the F1* interface.

In an embodiment, the DUs of the IAB nodes 201, 202 (acting as RAN node) can include the, RLC, MAC and PHY layers of the NR protocol stack. When an IAB node (consider 201) acts as a UE for carrying data generated by the IAB node 201 or for receiving data terminating on the IAB node 201, the MT of the IAB node 201 can utilize the UE protocol stack, i.e., RRC, RLC, MAC and PHY layers, to relay control plane and user plane information through SRBs and DRBs. The adaptation layers of the IAB nodes 201, 202, and the IAB donor 200 can coordinate between the respective DUs and MTs. The MTs of the IAB nodes 201, 202 can sustain Non-Access Stratum (NAS) connectivity to the core network (NGC 103). The MTs of the IAB nodes 201, 202 can further sustain a PDU session through the NGC 103 to provide connectivity for different services availed by the UEs 205, 206.

Each IAB node can determine an IAB node at which a UE terminates. The IAB nodes can determine the terminating point of the UEs through parameters such as UE ID, UE bearer ID, routing information, and so on, shared by the CU of the IAB donor. The parameters can be indicated on a table (including information for managing adaptation layer functionality) provided by the IAB donor or based on the parameters available at IAB nodes.

For each packet generated by the adaptation layer, information (such as the UE ID, the IAB node route ID, and so on) can be added to the packets by the adaptation layer. Alternatively, routing between the different IAB nodes can be performed based on the UE bearer ID.

Figure 2B:
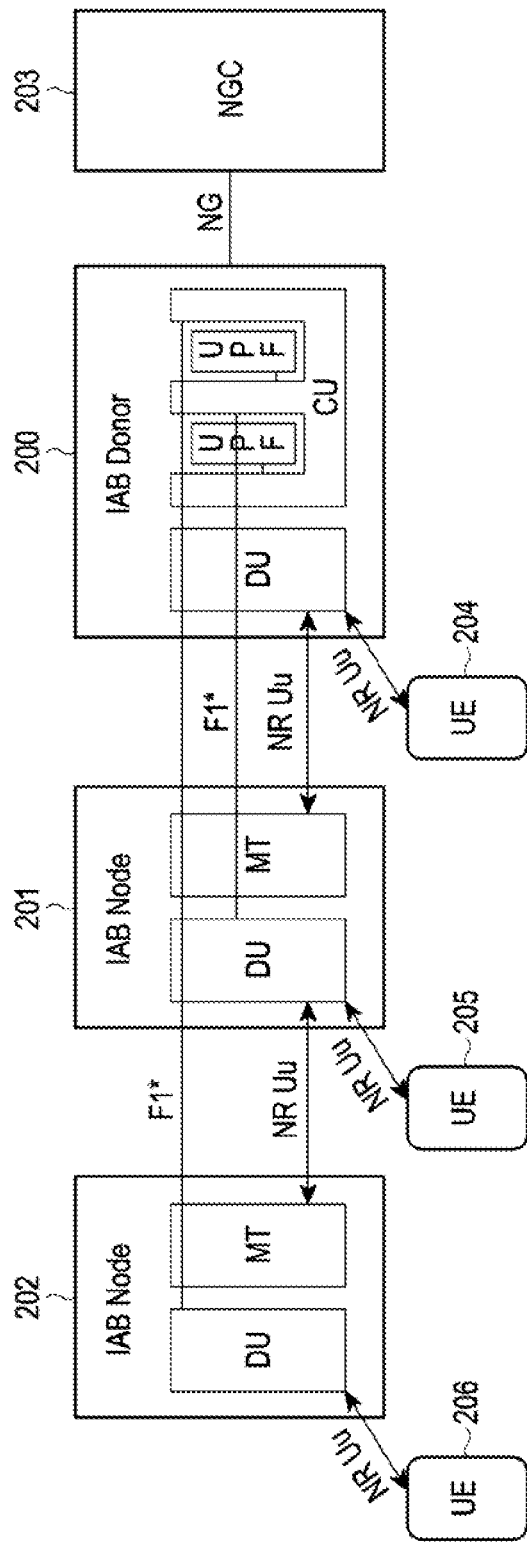
FIG. 2B illustrates 5G network, wherein the IAB donor functions as gNB having a split CU-DU architecture, according to embodiments as disclosed herein.

FIG. 2B illustrates a 5G network, wherein the IAB donor 200 functions as a gNB and has a split CU-DU architecture, according to embodiments as disclosed herein. In the architecture depicted in FIG. 2B, the CU of the IAB donor 200 has User Plane Function (UPF) embedded in the IAB donor 200. The adaptation layer can be included in the IAB nodes 201, 202, and the IAB donor 200 for enabling data routing and forwarding. The MT stacks in each of the IAB nodes 201, 202 can establish a PDU session with the UPF included in the CU of the IAB donor 200. The PDU session can serve as a point to point link between the DUs of the IAB nodes 201 and 202 and the CU of the IAB donor 200. Each of the backhaul links in the architecture establishes RLC channels between the IAB nodes 201, 202, and between the IAB node 201 and the IAB donor 200.

Figure 2C:
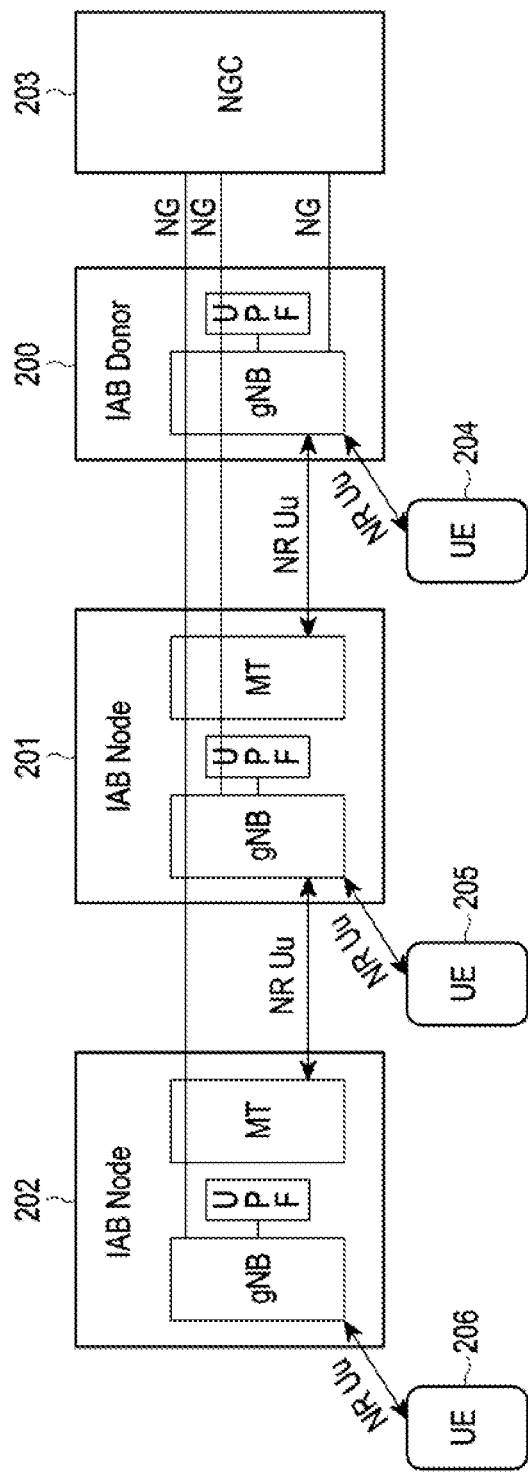
FIG. 2C illustrates 5G network, wherein IAB nodes are having gNB capabilities, according to embodiments as disclosed herein.

FIG. 2C illustrates a 5G network, wherein the IAB nodes 201, 202 are having gNB capabilities, according to embodiments as disclosed herein. The RAN node part (DUs) of the IAB nodes 201, 202 and the IAB donor 200 can be referred to as gNBs. The IAB nodes include the complete NR protocol stack. The MTs of the IAB nodes 201, 202 can act as relays and can include the complete NR protocol stack included at the UEs 204, 205, 206. An MT of the IAB node (consider 201) can establish NR Uu links with the gNB (DU) on the parent IAB-node, i.e., the IAB donor 200. In addition to the complete gNB functionality, the IAB donor 200, and the IAB nodes 201, 202, have the UPFs collocated and embedded with the respective DUs. As a result, an independent PDU session can be created on every backhaul link in the 5G network. The gNBs and the MTs of each of the IAB nodes 201, 202 can include adaptation layers to support routing function for forwarding data between PDU sessions of adjacent backhaul links, thereby creating a forwarding plane across the backhaul links. The Internet Protocol (IP) based interfaces can be carried over the forwarding plane.

The IAB nodes 201, 202, and the IAB donor 200 can support both stand-alone (SA) and Non-stand-alone (NSA) deployment. For NSA, relaying of the UE's Secondary Cell Group (SCG) path (NR) can be performed, wherein the relaying of the UE's Master Cell Group (MCG) path (LTE) can be based on support for IAB based relaying of LTE-access.

The architectures (depicted in FIGS. 2A-2C) have RLC channels at the backhaul NR Uu interface. As RLC cannot identify data of different UE bearers, and routing information, the adaptation layer can perform the functionalities of identifying the data of the different UE bearers and the routing information. The adaptation layer can be introduced in the MAC or RLC layers. The adaptation layer can be placed above or below the RLC layer, or within the MAC layer.

When a UE 204, 205, 206 is attached to the IAB donor 200 directly or through at least one IAB node 201, 202, the IAB donor 200 can establish a F1-U or F1*-U link, based on the IAB architecture depicted in FIGS. 2a-2c. The F1-U or F1*-U link can be a direct link between the IAB donor 200 and the UE 204, 205, 206 or through IAB nodes 201, 202 between the UE 204, 205, 206 and the IAB donor 200. When the F1 or F1* interface is established by the CU of the IAB donor 200, adaptation layers of the IAB nodes 202, 201 and the IAB donor 200 can be configured with routing information (such as route ID and UE ID (for routing of packets belonging to different UEs through the IAB nodes 201, 202)). In an embodiment, a table can be created by the CU of the IAB donor 200 indicating the routing information such as number of UEs attached to an IAB node, number of IAB nodes through which a UE is connected to the IAB donor 200, route ID, and so on. In an example, the routing information can comprise of a route ID between the UE 206 and the IAB donor 200 through the IAB nodes 202, 201.

Figure 3:
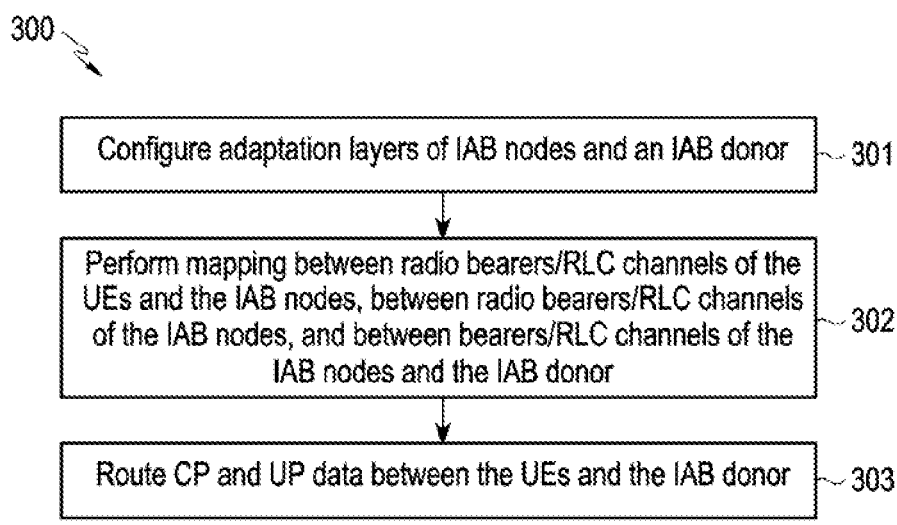
FIG. 3 is a flowchart depicting a method for configuring adaptation layers of the IAB nodes and the IAB donor, according to embodiments as disclosed herein.

FIG. 3 is a flowchart 300 depicting a method for configuring the adaptation layers of the IAB nodes and the IAB donor, according to embodiments as disclosed herein. At step 301, the method includes configuring the adaptation layers of the IAB nodes 201, 202, and the IAB donor 200. The adaptation layers can be configured by the CU of the IAB donor 200 or by the DUs of the IAB nodes 201, 202, and the IAB donor 200. If the adaptation layer at the IAB donor 200 terminates at the CU, then the CU can configure the adaptation layers of the IAB nodes 201, 202, and the IAB donor 200. However, if the adaptation layer at the IAB donor (200) terminates at the DU, the DUs of the IAB nodes 201, 202 can configure the respective adaptation layers.

The adaptation layers can be configured based on parameters, such as, but not limited to, UE ID, SRB ID, DRB ID, source IAB node DU ID, destination DU ID, QoS information pertaining to each SRB and DRB, route ID, indication of SRB and DRB, and so on. The headers of the adaptation layers can include the parameters. If the adaptations layers are configured by the respective DUs, then the parameters can be shared by the CU to the respective DUs.

At step 302, the method includes performing mapping of radio bearers/RLC channels of the UEs 204, 205, 206 with bearers/RLC channels of the IAB donor 200, the IAB node 201, and the IAB node 202 respectively; bearers/RLC channels of the IAB node 201 with bearers/RLC channels of the IAB node 202; and bearers/RLC channels of the IAB node 201 with the bearers/RLC channels of the IAB donor 200. The adaptation layers can be configured to select methods to be adopted for mapping and the bearers/RLC channels. The adaptation layers can be configured to perform the mapping between: the bearers/RLC channels of the UEs 204, 205, 206 and the IAB donor 200, IAB node 201 and IAB node 202 respectively; the bearers/RLC channels of the IAB node 201 and the IAB node 202; the bearers/RLC channels of the IAB node 201 and the IAB donor 200.

The mapping can be performed by either of the DUs of the IAB nodes 201, 202, and the IAB donor 200; or the CU; based on whether the adaptation layers of the IAB nodes 201, 202, and the IAB donor 200 have been configured by the DUs or the CU. The methods adopted by the adaptation layers of the IAB nodes 201, 202, and the IAB donor 200, to perform the mapping, can satisfy the QoS requirements of the bearers/RLC channels. The mapping is performed to schedule the routing of data between the UEs 204, 205, 206 and the IAB donor 200.

In an embodiment, the bearers/RLC channels of the plurality of UEs can be mapped with preconfigured bearers/RLC channels of either of the IAB donor 200, the IAB node 201 or the IAB node 202. In an embodiment, the bearer/RLC channel of each of the plurality of UEs can be mapped with the respective bearer/RLC channel of either of the IAB donor 200, the IAB node 201 or the IAB node 202.

In an embodiment, the bearers/RLC channels of each of the plurality of UEs can be mapped to a single bearer/RLC channel of either of the IAB donor 200, the IAB node 201 or the IAB node 202. In an embodiment, the bearers/RLC channels of the plurality of UEs with same QoS requirement can be mapped to a single bearer/RLC channel of either of the IAB donor 200, the IAB node 201 or the IAB node 202. In an embodiment, the bearers/RLC channels of a PDU session in each of the plurality of UEs can be mapped to a single bearer/RLC channel of the IAB donor 200, the IAB node 201 and the IAB node 202 respectively.

In an embodiment, the bearers/RLC channels of a PDU session in the plurality of UEs can be mapped to a single bearer/RLC channel of either of the IAB donor 200, the IAB node 201 or the IAB node 202. In an embodiment, the bearers/RLC channels of the plurality of UEs can be mapped to a single bearer/RLC channel of either of the IAB donor 200, the IAB node 201 or the IAB node 202.

At step 303, the method includes routing the CP data and the UP data between the UEs 204 and 205, and the IAB donor 200. There may be no routing involved for transfer of uplink/downlink UP and CP data between the UE 204 and the IAB donor 200, as the UE 204 is directly connected to the IAB donor 200. The CP and UP data from/to the UE 205 can be routed to the IAB donor 200 through the IAB node 201, and the CP and UP data from/to the UE 206 can be routed to the IAB donor 200 through the IAB nodes 202 and 201.

The adaptation layers of the IAB nodes 201, 202, and the IAB donor 200 can be configured to manage the routing of the CP data and UP data between the IAB donor 200 and the UE 206 through the IAB nodes 201, 202. For the UE 205, the CP data and UP data are routed from/to the IAB donor through the IAB node 201. The CP data and UP data are routed based on routing information in the adaptation layers of the IAB nodes 201, 202 and the IAB donor 200. The routing information can include the ID of the UE 204, bearer ID (identify SRBs, DRBs, RLC channels), source DU ID and destination DU ID (DU ID of IAB node 202) for routing of uplink and downlink CP/UP data respectively, path/route ID (ID of the route between the UE 206 and the IAB donor 200 through the IAB nodes 201, 202, and ID of the route between the UE 205 and the IAB donor 200 through the IAB node 201) if the route is configurable, and so on.

The CP data can be routed through an SRB or a special DRB assigned with a high priority. As the CP data is having a high QoS requirement, the DRB carrying the CP data can have the highest priority amongst the DRBs carrying the UP data. The UP data can be routed through the DRBs. The DUs of each of the IAB node 202 can be connected to the CU through a F1* link. The F1* link can comprise of a F1*-AP link and a F1*-U link. The CP data can be routed through the F1*-AP link and the UP data can routed through the F1*-U link. If the CP data is received in the high DRB, the CP data can be transferred from the F1*-U link to the F1*-AP link.

The various actions in the flowchart 300 may be performed in the order presented, in a different order, or simultaneously. Further, in some embodiments, some actions listed in FIG. 3 may be omitted.

Figure 4A:
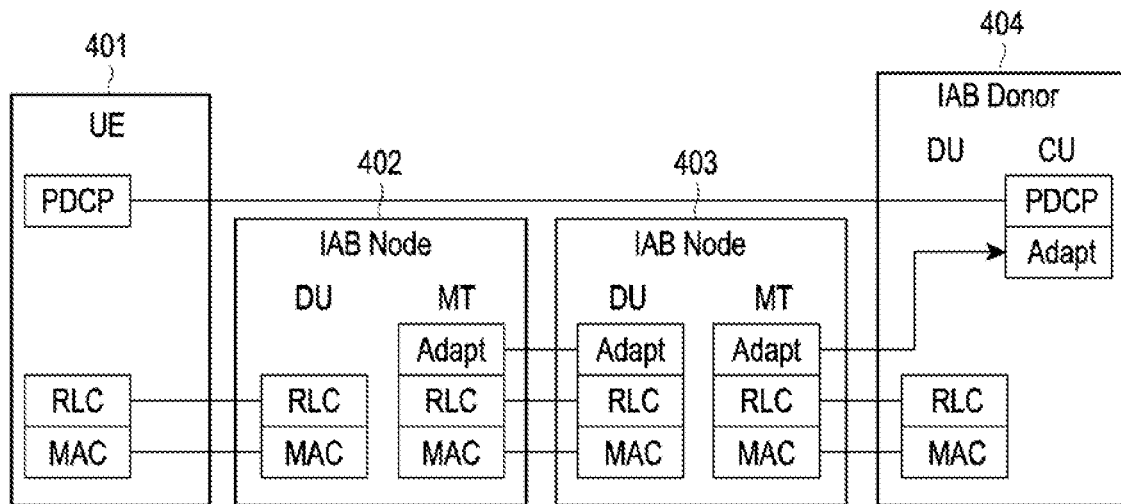
FIG. 4A depicts an example, wherein the adaptation layer of the IAB donor is terminating at the CU, according to embodiments as disclosed herein.

FIG. 4A depicts an example, wherein the adaptation layer of the IAB donor 404 is terminating at the CU, according to embodiments as disclosed herein. The adaptation layer of the IAB donor 404 may terminate at the CU or the DU of the IAB donor 404. As depicted in FIG. 4A, the adaptation layer can terminate at the CU. Therefore, the CU can manage the configuration and reconfiguration of the adaptation layers of the IAB donor 200 and the IAB nodes 201, 202. The CU of the IAB donor 404 can configure/reconfigure the adaptation layers of the IAB donor 404, and the IAB nodes 402, 403, with parameters such as, but not limited to, method adapted to perform bearer/RLC channel mapping between UE 401 and IAB node 402, between IAB nodes 402, 403, and between IAB node 403 and IAB donor 404, routing information (the path through which the data belonging to the UE 401 is to be forwarded, the change in the path through which the data belonging to the UE 401 is to be forwarded or received, address of IAB nodes (through which data is to be forwarded), and so on), UE bearer ID (to identify the bearer and determine the UE with which the bearer belongs, in case bearers of multiple UEs are received), UE ID (to identify a UE), QoS information (for multiplexing and de-multiplexing of packets belong to different services with varying QoS requirements), mapping of UE bearers over RLC channels of all the IAB nodes, and so on. The CU of the IAB donor 404 can share all or some of these parameters with the IAB nodes 402, 403.

In an example, consider that the UE 401 is attached to the IAB donor 404. In this scenario, the CU can identify whether the UE 401 is served by IAB nodes (402, 403) or directly by the IAB donor 404. The route through between the UE 401 and the IAB donor 404 can be specified using a route ID. On identifying the route between the IAB donor 404 and the UE 401, the CU can set up the F1-U or F1\*-U link with the IAB node 402, through which the UE 401 is communicating with the IAB donor 404. Each of the DUs of the IAB nodes 402, 403 can connect to the CU of the IAB donor 404 using the F1\* interface. The CU of the IAB donor 404 can map each of the bearers of the UE 401 with each of the bearers of the IAB node 402. Once the bearer mapping is completed, the CU can share the mapping information with all the configured IAB nodes (herein 402, 403), i.e. routing nodes through which the UE 401 is communicating with the IAB donor 404.

In an embodiment, the CU can perform mapping between bearers of UE 401 and IAB node 402, mapping between bearers of IAB nodes 402, 403, and mapping between bearers of the IAB node 403 and the IAB donor 404. If the adaptation layer is placed below the RLC layers of the UE 401, IAB nodes 402, 403, and the IAB donor 404; then the mapping can be performed between RLC channels of the UE 401 and the IAB node 402, between RLC channels of the IAB nodes 402, 403, and between RLC channels of the IAB node 403 and the IAB donor 404.

In an embodiment, the CU of the IAB donor 404 can configure/reconfigure the adaptation layer of each IAB node (or IAB donor DU) during an attach procedure and/or detach procedure or whenever routing information is changed. The reconfiguration of the adaptation layer of the IAB nodes 402, 403 or the IAB donor DU can be performed through the F1\* interface. Consider that there is a change in the termination point of a UE. In such instances, the CU can reconfigure the adaptation layers of the IAB node from which the UE is detached and the IAB node to which the UE is currently attached. The reconfiguration can be performed by updating the routing information. Based on the update in the routing information, mapping can be performed between the bearers/RLC channels of the UE 401 and the IAB node 402, the bearers/RLC channels of the IAB nodes 402, 403, and the bearers/RLC channels of the IAB node 403 and the IAB donor 404. The mapping can be performed based on number of available bearers, such that the QOS of a service (whose data is being routed) is maintained.

Figure 4B:
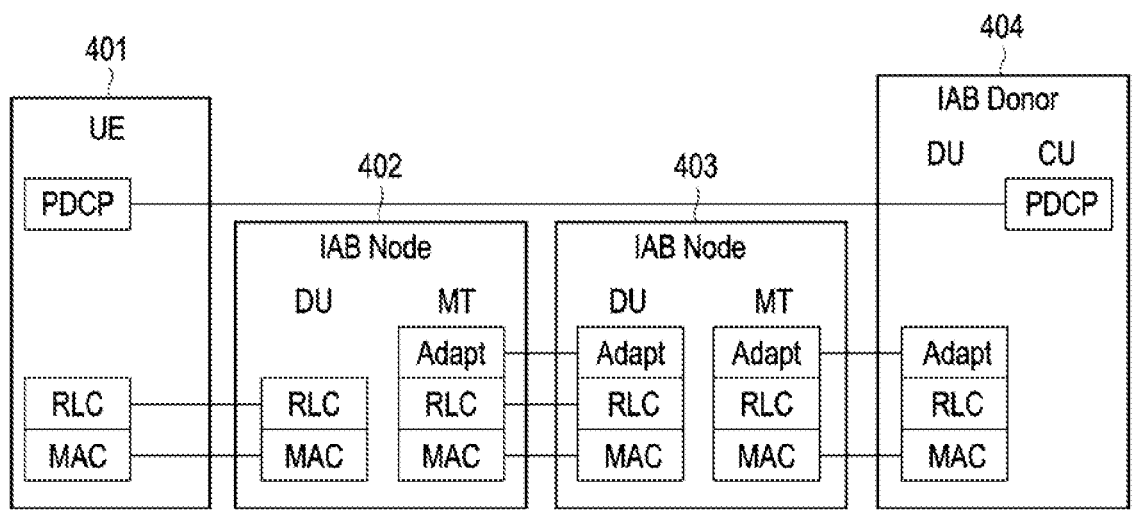
FIG. 4B depicts an example, wherein the adaptation layer of the IAB donor is terminating at the DU, according to embodiments as disclosed herein.

FIG. 4B depicts an example, wherein the adaptation layer of the IAB donor 404 is terminating at the DU, according to embodiments as disclosed herein. When the adaptation layer of the IAB donor 404 terminates at the DU, the CU can share the parameters (such as, but not limited to, method adopted to perform bearer/RLC channel mapping, UE bearer ID, UE ID, IAB node ID, QoS information, routing information, and so on) that are required for configuration of the adaptation layer of the DUs of the IAB donor 404 and the IAB nodes 402, 403. The CU of the IAB donor 404 can share the parameters with the IAB nodes 402, 403 during IAB MT (of the IAB nodes 402, 403) attach procedure with the IAB donor 404. The parameters can be shared through the F1\* interface by CU to the DUs of the IAB donor 404 and the IAB nodes 402, 403. Based on the parameters shared by the CU of the IAB donor 404, the DUs of the IAB donor 404 and the IAB nodes 402, 403 configure the individual adaptation layers for relaying (routing) data from multiple UEs across the NR backhaul links. The adaptation layer can be configured to perform mapping between the bearer/RLC channels of the IAB donor 404 and the IAB node 403, between the bearer/RLC channels of the IAB nodes 402, 403, and between the bearer/RLC channels of the UE 401 and the IAB node 402.

In an embodiment, the IAB nodes 402, 403 and the IAB donor 404 can perform mapping between the bearers/RLC channels. The mapping can be performed based on a preconfigured method. A predefined number of IAB bearers/RLC channels can be established between the IAB nodes 402, 403, the IAB donor 404 and the IAB node 403.

The IAB nodes 402, 403 and the IAB donor 404 can configure/reconfigure the respective adaptation layers at appropriate instances based on the parameters shared by the CU. In an example, the adaptation layer can be configured using the appropriate routing information for enabling routing of data from/to source/destination UEs through correct IAB nodes. In another example, the adaptation layer can be reconfigured during UE attach/detach procedure with/from specific IAB nodes.

Figure 5:
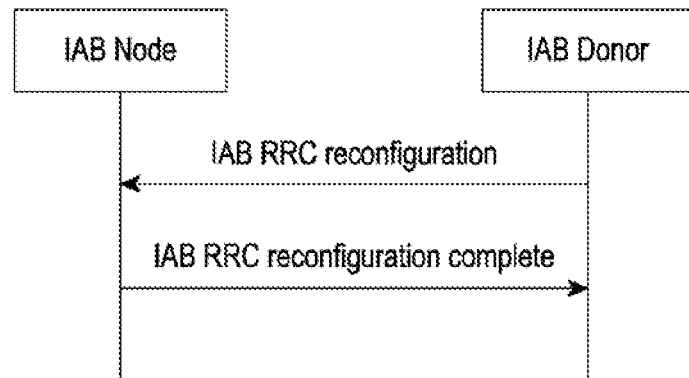
FIG. 5 depicts configuration of adaptation layer using a Radio Resource Control (RRC) configuration message, according to embodiments as disclosed herein.

FIG. 5 depicts configuration of adaptation layer using RRC configuration message, according to embodiments as disclosed herein. If the CU configures the adaptation layers of the IAB donor and the IAB nodes, the CU can reconfigure the adaptation layers based on update in routing information, wherein the occurrence of the update can be due to scenarios, such as, but not limited to, UE attach/detach with a specific IAB nodes/donor, change in IAB node status, inability of DUs in the IAB nodes/donor to reconfigure individual adaptation layers, and so on.

As depicted in FIG. 5, in an embodiment, the IAB donor (gNB) can reconfigure the adaptation layer of an IAB node by sending an IAB RRC reconfiguration message to the IAB node. The RRC reconfiguration message can reconfigure the lower layers of the IAB node (such as RLC, MAC, and PHY). Once the adaptation layer of the IAB node is reconfigured, the IAB node can send an IAB RRC reconfiguration complete message to the IAB donor.

Figure 6A:
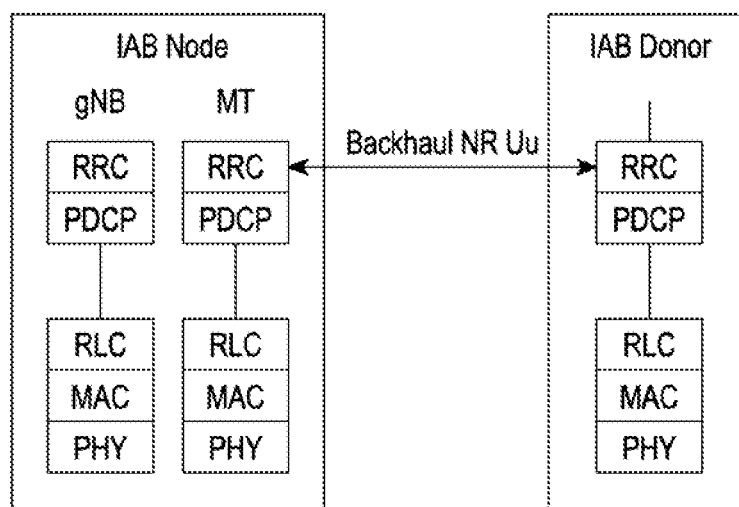
FIGS. 6A and 6B depict example transfer of RRC messages between an IAB node and an IAB donor, according to embodiments as disclosed herein.
Figure 6B:
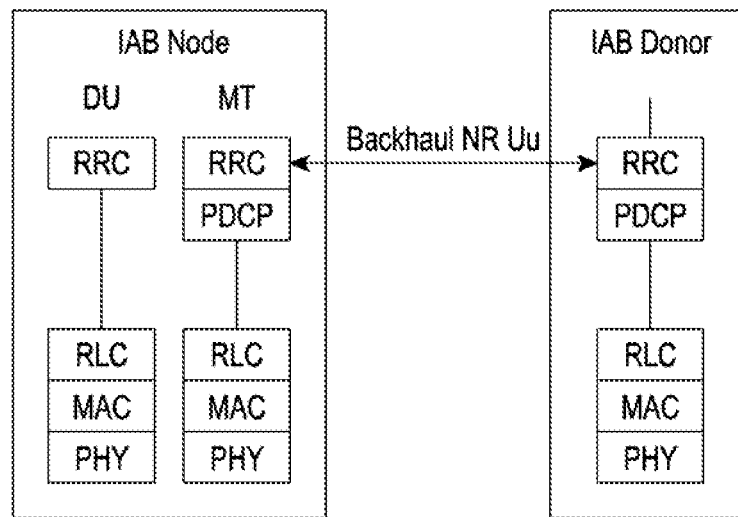

FIGS. 6A and 6B depict example transfer of RRC messages between an IAB node 601 and an IAB donor 602, according to embodiments as disclosed herein. As depicted in FIG. 6A, consider that the RAN part (DU) of the IAB node 601 comprises gNB functionality. The IAB node 601, when acting as a UE, can communicate with either the IAB donor 602 using the MT. The gNB part (DU) of the IAB node 601 can receive and decode RRC messages received from a UE (not shown). If the gNB part (DU) of the IAB node 601 intends to send RRC messages with the IAB donor 602, then the gNB part of IAB node 601 can send the RRC messages to the IAB donor 601 through a F1-AP link. The F1-AP link can terminate at the gNB of the IAB node 601, and the signaling messages can be transferred to the IAB donor 602 through the F1-AP link.

As depicted in FIG. 6B, the DU stack does not include the RRC layer. The RRC messages generated by the IAB donor 602 for the UE, or by the UE for the IAB donor 602 (gNB), can pass through IAB nodes (herein IAB node 601) prior to being delivered to the IAB donor 602. In order to share the RRC messages, SRBs can be set between IAB nodes (considering the IAB node 601 is connected to the IAB donor 602 through other IAB nodes) or between the IAB node 601 and the IAB donor 602 (in this example). The SRBs can carry the RRC messages from the IAB node 601 to the IAB donor 602 or from the IAB donor 602 to the UE. The RRC messages received by RLC entity of DU in IAB node 601 can be transferred to the RLC entity of the MT, which sends the RRC messages to the IAB donor 602 using the SRBs.

The F1-AP protocol can generate an RRC container and transfer the RRC messages over the SRBs between the IAB node 601 and the IAB donor 602. The adaptation layer at the MT or DU of the IAB node 601 can route the RRC messages through the appropriate SRB. The adaptation layer in the DU of the IAB node 601 can be configured to differentiate between the CP and UP packets. The adaptation layer on receiving a packet including the RRC messages from the UE can identify that the received packet is a CP packet. In an embodiment, the received packet can be sent to the F1-AP layer. When the adaptation layer of the MT receives the packet from the F1-AP layer, the adaptation layer can consider that the received packet is a CP packet and accordingly transfer the message over an SRB between the IAB node 601 and the IAB donor 602. In an embodiment herein, the transfers of the RRC message can be achieved using a new RRC container over an existing SRB. In an embodiment herein, the transfer of the RRC message can be achieved using a new SRB defined for the F1-AP layer. The adaptation layer can perform the mapping between the new and existing SRBs between the IAB node 601 and the IAB donor 602.

If the RRC messages are sent by the IAB donor 602 to the MT of the IAB node 601, the RRC layer of the MT on receiving the RRC messages can pass this message to the F1-AP or the DU for further process further.

In an embodiment, the IAB nodes can share the RRC (signaling) messages using UP bearers of the IAB node 601 mapped with the UP bearers of the IAB donor 602. If the signaling data is transferred over UP bearers, then an interface between the CU-CP and CU-UP at the IAB donor 602 can be used. An indication can be provided to the CU-UP to aid the CU-UP plane in identifying the RRC messages (signaling data). This can be achieved by setting up the specific UP bearer which can be used to transfer the RRC messages.

In an embodiment, the RRC message can be transferred using IAB DRBs. The IAB node 601 can be preconfigured to reserve a DRB to transfer control messages between IAB nodes or between the IAB node 601 and the IAB donor 602. Although QoS is not associated with SRBs, CP messages such as RRC messages are of high priority. The IAB node 601 can ensure that the reserved DRB has a high priority. Once Packet Data Convergence Protocol-UP (PDCP-U) of the IAB donor 602 CU receives the packet including the RRC messages, the packet can be transferred to PDCP-CP (PDCP-U) of the IAB donor 602 CU. An interface can be defined between the PDCP-U and the PDCP-C within the CU. The PDCP-U can transfer the RRC messages to the RRC layer of the CU. The RRC messages can be transferred from the PDCP-U to the RRC layer through an interface.

Figure 7:
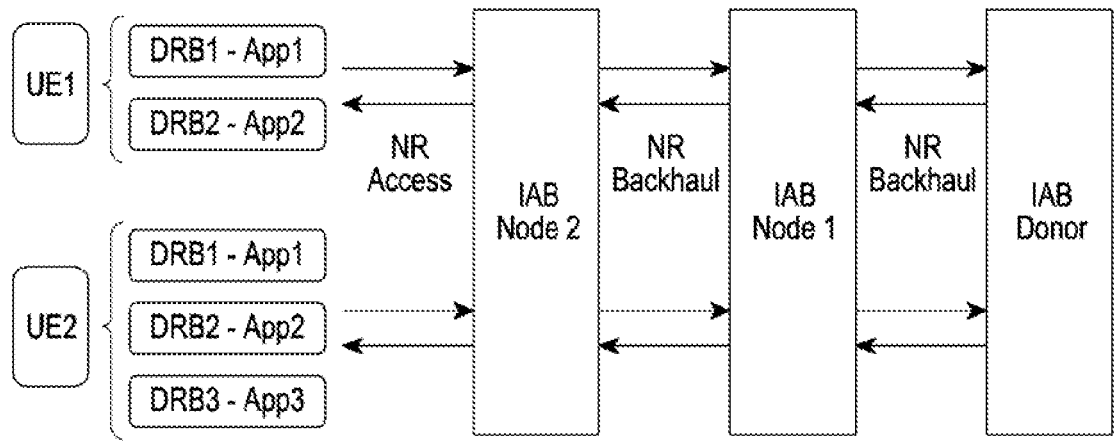
FIG. 7 depicts mapping of bearers of User Equipment (UE) 1 and UE 2 with IAB nodes and an IAB donor using preconfigured bearers, according to embodiments as disclosed herein.

FIG. 7 depicts mapping of bearers of UE 1 and UE 2 with IAB nodes and an IAB donor using preconfigured bearers, according to embodiments as disclosed herein. The number of DRBs a supported by a UE in NR can be 16 (split and duplicated DRBs can count as a single DRB). For IAB design, it can be assumed that there is a finite number of DRBs over a backhaul link. The embodiments include defining a maximum number of DRBs that can exist over the backhaul link. The number of DRBs existing over the backhaul link can be based on the number of IAB nodes or the number of DRBs supported in NR. If the number of UEs connected to an IAB node is more than the maximum number of DRBs supported over backhaul, a bearer mapping method can be used for mapping UE DRBs with IAB DRBs over the NR Uu access link.

In an embodiment, there can be preconfigured bearers between each of the IAB nodes (IAB node 1 and 2) and between the IAB node 1 and the IAB donor. The number of preconfigured bearers can be fixed. Whenever a new UE bearer is added, the UE bearer can be mapped with a preconfigured bearer. The mapping of the UE bearer with the preconfigured IAB bearer can be performed by the IAB node 2, the IAB donor or both. The mapping can be performed based on predetermined rules which can be based on QoS or QFI or 5QI associated with the UE bearer, PDU session, UE ID, and so on. The mapping rules among the different IAB nodes can be based on the same IAB node or on different IAB nodes. The mapping can be performed by the adaptation layer of the IAB nodes or the IAB donor.

Figure 8:
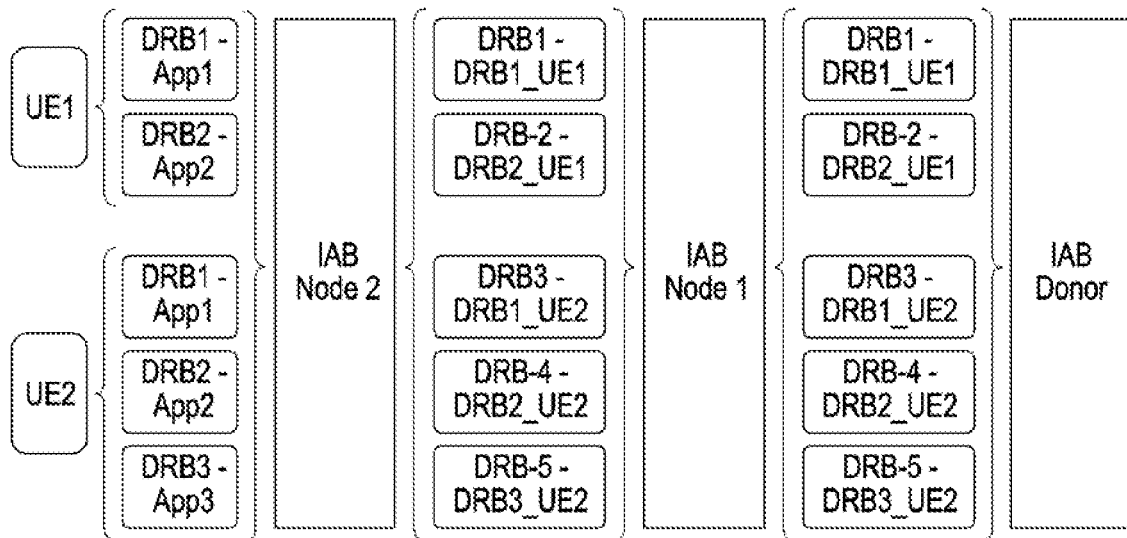
FIG. 8 depicts mapping of Dedicated Radio Bearers (DRBs) of UE 1 and UE 2 with DRBs of the IAB nodes and an IAB donor, wherein DRBs of the UEs are directly mapped with DRBs of the IAB nodes, according to embodiments as disclosed herein.

FIG. 8 depicts mapping of DRBs of UE 1 and UE 2 with DRBs of the IAB nodes and the IAB donor, wherein DRBs of the UEs are directly mapped with DRBs of the IAB nodes, according to embodiments as disclosed herein. In an embodiment, when a DRB is established for a certain UE, a corresponding DRB can also be established in the backhaul NR interface between the IAB nodes and the IAB donor. The number of established IAB DRB backhaul links is equal to the number of established DRBs for different UEs. Thus, there is a one-to-one mapping between the DRBs of the UEs and the DRBs of the IAB nodes.

Figure 9:
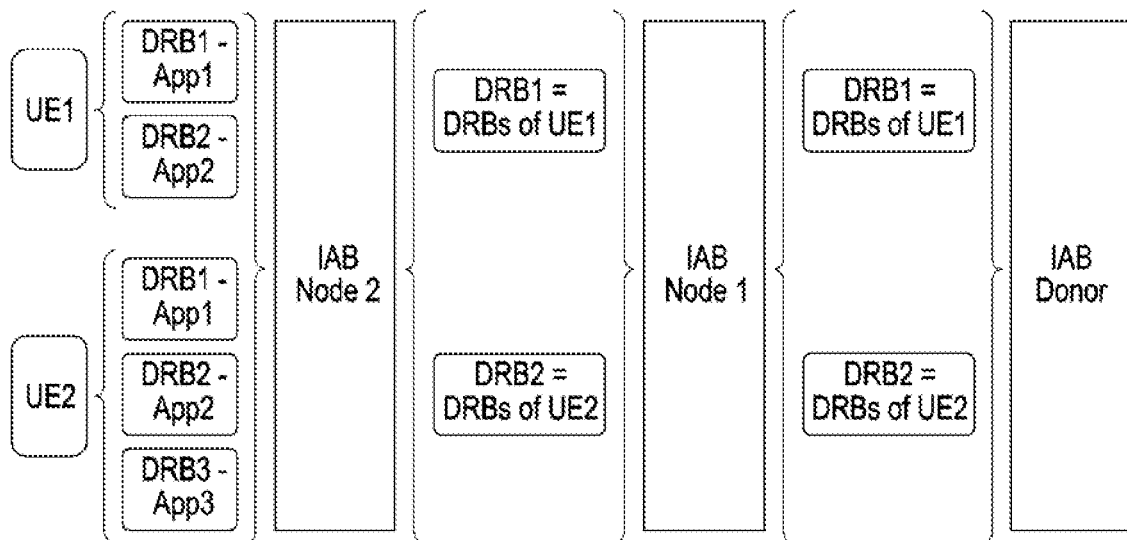
FIG. 9 depicts mapping of the DRBs of UE 1 and UE 2 with the DRBs of the IAB nodes and the IAB donor, wherein the mapping is based on the number of UEs connected to an IAB node, according to embodiments as disclosed herein.

FIG. 9 depicts mapping of the DRBs of UE 1 and UE 2 with the DRBs of the IAB nodes and the IAB donor, wherein the mapping is based on the number of UEs connected to an IAB node, according to embodiments as disclosed herein. In an embodiment, the IAB node 2 can establish IAB DRBs based on number of UEs connected to the IAB node 2. As depicted in FIG. 9, as two UEs, viz., UE 1 and UE 2 are connected to the IAB node 2, two DRBs can be established over the backhaul links. Thus, the number of DRBs established by the IAB node 2 in the backhaul links can be equal to the number of UEs attached to the IAB node 2. Thus, at least one DRB from a UE is mapped with an IAB node DRB. At the IAB donor, for each data block, the DRB within the UE needs to be identified.

Figure 10:
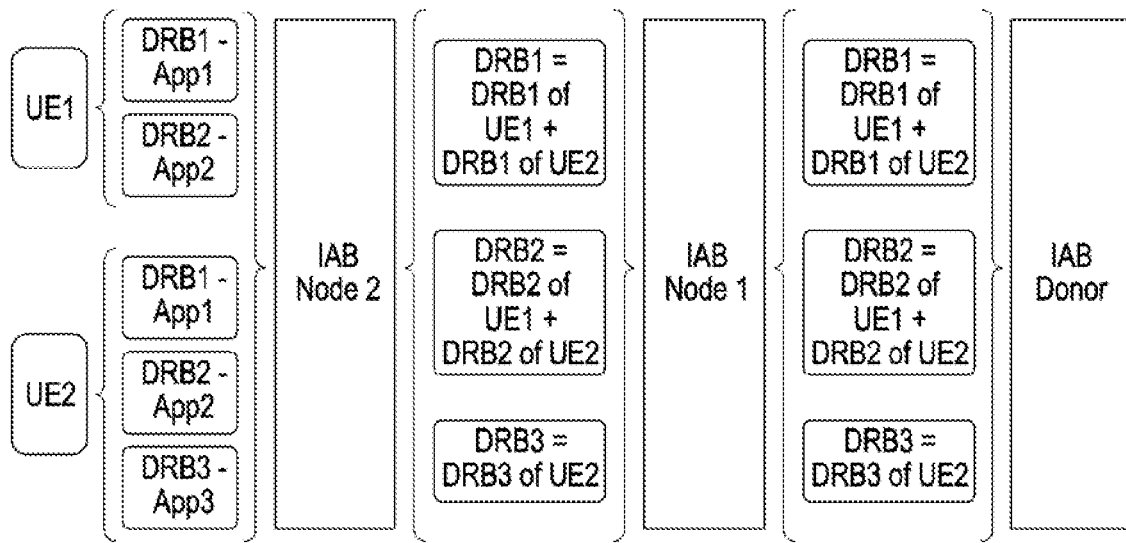
FIG. 10 depicts mapping of the DRBs of UE 1 and UE 2 with the DRBs of the IAB nodes and the IAB donor, wherein the mapping is based on Quality of Service (QoS) configured for different DRBs of the UEs, according to embodiments as disclosed herein.

FIG. 10 depicts mapping of the DRBs of UE 1 and UE 2 with the DRBs of the IAB nodes and the IAB donor, wherein the mapping is based on QoS requirement of different DRBs of the UEs, according to embodiments as disclosed herein. In an embodiment, the IAB node 2 can establish DRBs over backhaul links based on QoS requirement of each UE DRB. The IAB node 2 can multiplex the DRBs of UE 1 and UE 2, having similar QoS requirement (as the DRBs are carrying data of an application 1 having a particular QoS requirement) into a single IAB DRB. Thus, the DRBs of the UEs with similar QoS characteristics are mapped with a DRB of the IAB nodes. Consider that there are two DRBs belonging to UE 1 and UE 2 that carry data of an application 1. The IAB node 2 can multiplex the data in two DRBs, belonging to the application 1, into a single DRB. Similarly, data of applications 2 and 3 in different DRBs belonging to UE 1 and UE 2 are multiplexed in respective DRBs.

Figure 11:
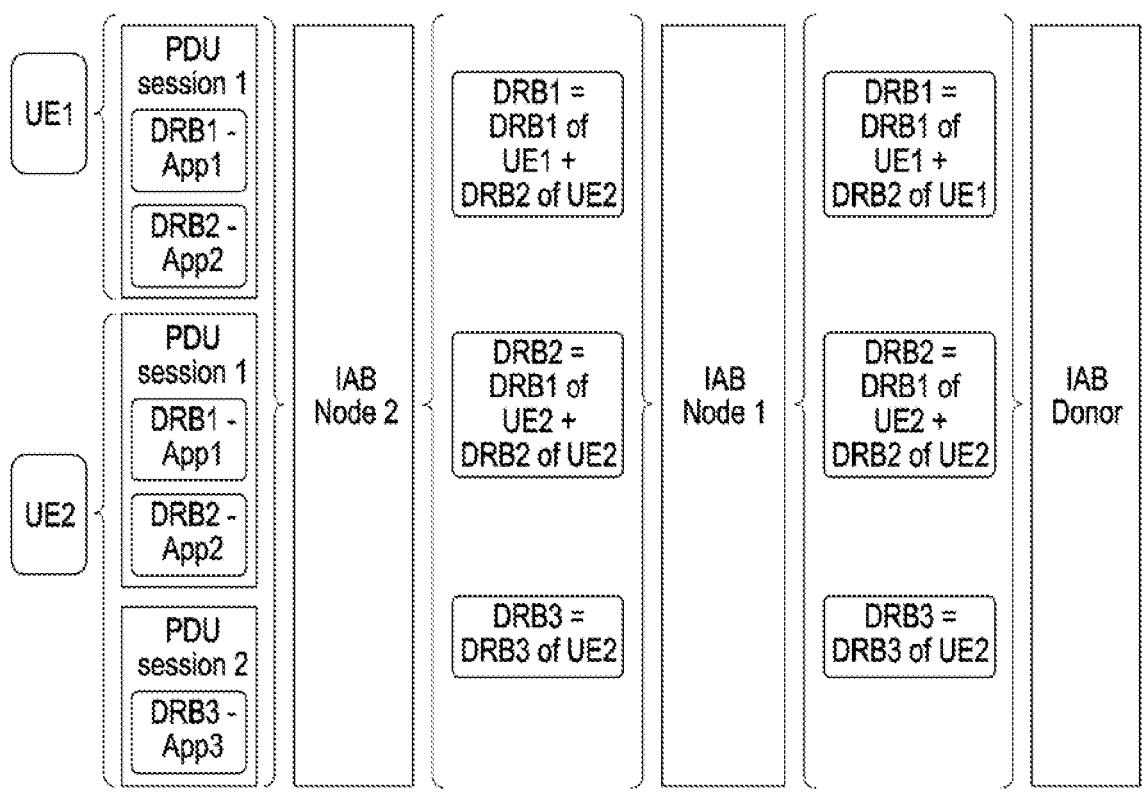
FIG. 11 depicts mapping of the DRBs of UE 1 and UE 2 with the DRBs of the IAB nodes and the IAB donor, wherein the mapping is based on number of Protocol Data Unit (PDU) sessions configured for each UE, according to embodiments as disclosed herein.

FIG. 11 depicts mapping of the DRBs of UE 1 and UE 2 with the DRBs of the IAB nodes and the IAB donor, wherein the mapping is based on number of PDU sessions configured for each UE, according to embodiments as disclosed herein. The IAB node 2 can establish DRBs based on the number of PDU sessions configured for each UE. For each UE, there can be a one-to-one mapping between PDU sessions including at least one UE DRB, and IAB node DRBs over the backhaul link. The number of DRBs established at the backhaul links can be equal to the number of PDU sessions configured for different UEs. As depicted in FIG. 11, for UE 1, a single PDU session can be configured. Although there are three UE 1 DRBs, a single DRB can be established for UE 1 at the backhaul interface. Similarly, for UE 2, two PDU sessions can be configured. There can be two DRBs established for UE 2 at the backhaul interface.

Figure 12:
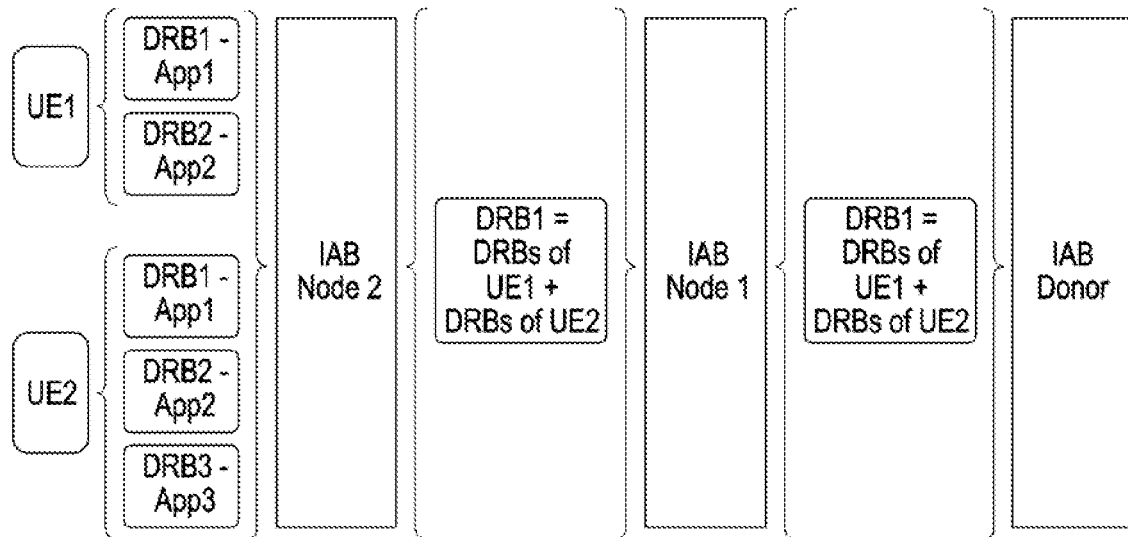
FIG. 12 depicts mapping of the DRBs of UE 1 and UE 2 with the DRBs of the IAB nodes and the IAB donor, wherein all DRBs of all UEs are mapped to a single IAB DRB, according to embodiments as disclosed herein.

FIG. 12 depicts mapping of the DRBs of UE 1 and UE 2 with the DRBs of the IAB nodes and the IAB donor, wherein all DRBs of all UEs are mapped to a single IAB DRB, one of the PDU sessions in both UEs is same, the DRBs of the UEs belonging to the same PDU session can be mapped to a single IAB node DRB.

Based the method (depicted in FIGS. 7-14) adopted to perform mapping between the bearers of the UEs and the IAB nodes, each IAB node can require a specific identifier to perform data forwarding or routing information. Examples of the identifier required can be depicted in the table 1:

TABLE 1

| | One-to One Mapping | Per UE Mapping | Per QoS Mapping | Per PDU session Mapping per UE | Per PDU session Mapping | All-to-one Mapping |
|---|---|---|---|---|---|---|
| Number of DRBs b/w IAB nodes | Number of DRBs | Number of UEs | Number of QOS types | Number of PDU sessions per UE | Number of similar PDU session | 1 |
| Identification required between IAB nodes | No | DRBID | UE ID, DRB ID | DRBID | UE ID, DRB ID | UE ID, DRB ID |
| Bearer multiplexing between IAB nodes | No | Yes | Yes | Yes | Yes | Yes |
| QOS guarantee provided | Yes | No | Yes | Yes | FFS | No |
| Mapping information required at IAB node | UE DRB to IAB node DRB | UE to IAB node DRB | UE DRB to IAB node DRB | UE to IAB node DRB | UE DRB to IAB node DRB | None |
| Changes required at RLC/ adapt layer | No | Yes | Yes | Yes | Yes | Yes | according to embodiments as disclosed herein. As depicted in FIG. 12, the IAB node 2 can establish a single DRB for carrying data in all DRBs of UE 1 and UE 2 over the backhaul interface. Thus, all DRBs of the UEs connected at the IAN node 2 can be mapped to a single DRB of the IAB nodes. At the IAB donor, for each data block, a corresponding UE and DRB need to be identified.

Figure 13:
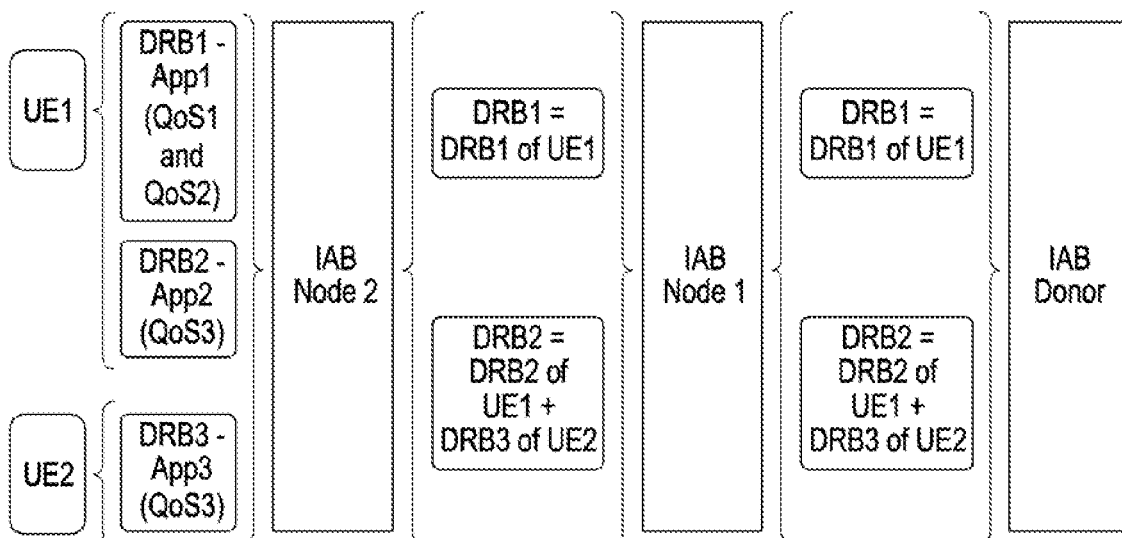
FIG. 13 depicts mapping of the DRBs of UE 1 and UE 2 with the DRBs of the IAB nodes and the IAB donor, wherein mapping of DRBs is based on multiple QoS configured for each DRB of each UE, according to embodiments as disclosed herein.

FIG. 13 depicts mapping of the DRBs of UE 1 and UE 2 with the DRBs of the IAB nodes and the IAB donor, wherein mapping of DRBs is based on multiple QoS configured for each DRB of each UE, according to embodiments as disclosed herein. The IAB node 2 can establish DRBs between the IAB nodes based on multiple QoS configured for each DRB. There can be a one-to-one mapping between the DRBs of the UEs, configured with a plurality of QoS, and the DRBs established by the IAB nodes over the backhaul links. The IAB node 2 can multiplex the DRBs with similar QoS characteristics in an IAB node DRB.

Figure 14:
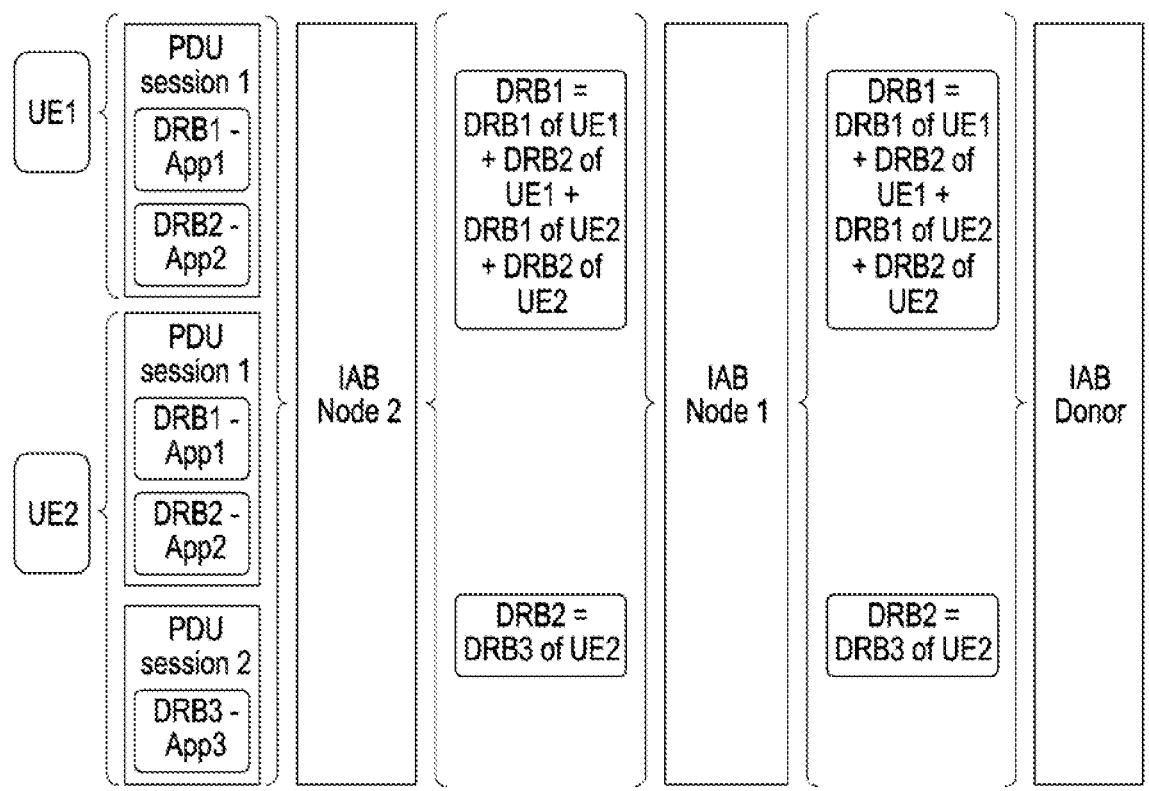
FIG. 14 depicts mapping of the DRBs of UE 1 and UE 2 with the DRBs of the IAB nodes and the IAB donor, wherein the mapping is based on PDU sessions configured for all UEs, according to embodiments as disclosed herein.

FIG. 14 depicts mapping of the DRBs of UE 1 and UE 2 with the DRBs of the IAB nodes and the IAB donor, wherein the mapping is based on PDU sessions configured for all UEs, according to embodiments as disclosed herein. The IAB node 2 can establish DRBs based on the number of PDU sessions configured for all UEs. There can be a one-to-one mapping between the PDU sessions and the DRBs of the IAB nodes over the backhaul link. The number of DRBs established at the backhaul links can be equal to the number of PDU sessions configured for all UEs. As depicted in FIG. 14, for UE 1, a single PDU session can be configured; and for UE 2, two PDU sessions can be configured. As In an embodiment herein, per-service/network mapping can be performed. Besides the methods adapted for mapping UE DRBs with the IAB node DRBs depicted in FIGS. 7-14, the mapping of the UE DRBs and the IAB node DRBs can also be based on a type of service supported by each DRB.

Figure 15:
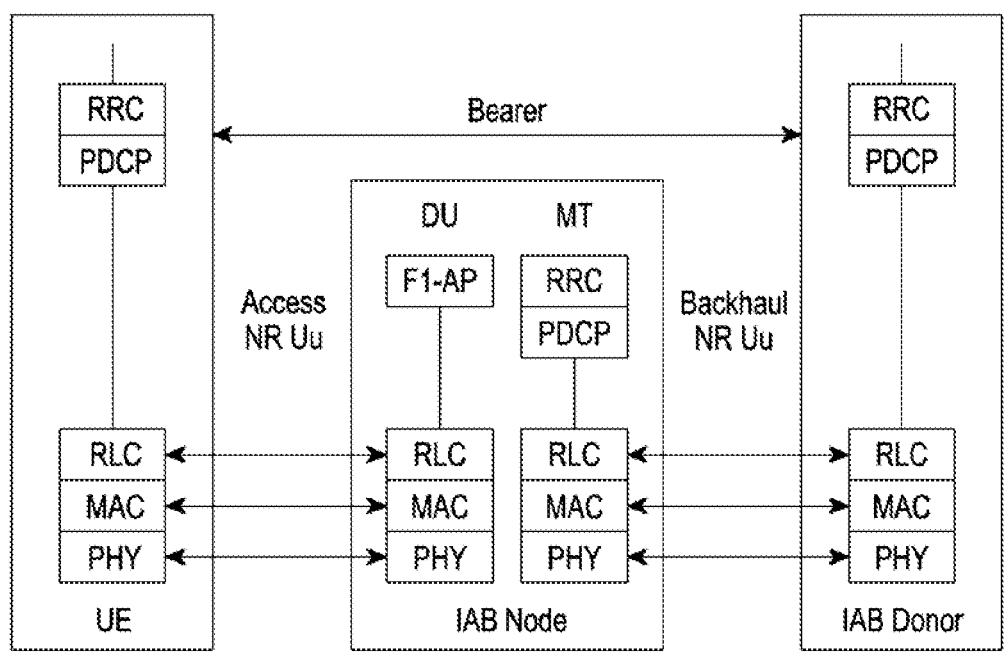
FIG. 15 depicts mapping between Radio Link Control (RLC) channels of a UE and the RLC channels of the IAB nodes, RLC channels between IAB nodes, and RLC channels between an IAB node and the IAB donor, according to embodiments as disclosed herein.

FIG. 15 depicts mapping between RLC channels of the UE and the RLC channels of the IAB nodes, RLC channels between IAB nodes, and RLC channels between an IAB node and the IAB donor, according to embodiments as disclosed herein. There can be a RLC channel mapping between the RLC channel of the IAB nodes and the UEs. The RLC channel mapping can be involved when the adaptation layer is below the RLC layer, i.e. within the MAC layer or above the MAC layer. The RLC channel mapping can also be involved if the adaptation layer is above the RLC layer. When a UE bearer is established along with UE RLC channel, the IAB node bearer can also be established along with IAB node RLC channel. This can be applicable for IAB node architecture depicted in FIGS. 2*a* and 2*b*, wherein bearers can terminate between UEs (204, 205, 206) and the IAB donor 200.

The mapping of IAB node RLC channels with UE RLC channels can be based on number of UE RLC channels attached to an IAB node. RLC channel mapping can be performed to define the maximum number of IAB RLC channels supported over backhaul links. In an embodiment, there can be a limited number of IAB RLC channels over backhaul NR interface. The number of RLC channels can be increased based on number of IAB nodes or based on number of RLC channels supported for NR. If the number of UEs connected to an IAB node is more than the number of IAB RLC channels, RLC channel mapping can be performed between RLC channels of the UE and the RLC channels of the IAB nodes over backhaul links for the IAB design. The methods defined in FIGS. 7-14 for bearer mapping can also be applicable for mapping RLC channels of the UE and the RLC channels of the IAB nodes.

In an embodiment herein, Logical Channel Prioritization can be performed across DRBs of different UEs, carrying data between the UEs and the IAB nodes. When one-to-one mapping is not used and multiple DRBs are mapped to a single DRB between IAB nodes, schedulers in the MAC layer at the IAB nodes multiplex data of same UE data onto a transport channel and the IAB nodes can de-multiplex the data. For each transport channel, the MAC layer can add the UE ID for each MAC PDU. Based on the UE ID, the receiving IAB node can identify the RLC channels belonging to a particular UE.

Each of the RLC channels can be assigned with a priority based on QoS. The IAB node scheduler can follow the rules, which can be based on LCP. The IAB node scheduler can multiplex data from different logical channels belonging to different UEs into a single transport channel. The IAB node scheduler can add UE ID/logical channel/IAB node ID with each MAC Service Data Unit (SDU), in order to enable the receiving IAB node to identify data belonging to different UEs and the RLC channel(s) associated with the different UEs.

The priority of the RLC channel(s) can be based on type of service supported by each RLC channel. The IAB node scheduler can prioritize data based on the type of prioritized service(s) supported by one or more logical channels.

The embodiments disclosed herein can be implemented through at least one software program running on at least one hardware device and performing network management functions to control the network elements. The network elements shown in FIGS. 2A-2C include blocks which can be at least one of a hardware device, or a combination of hardware device and software module.

The embodiments disclosed herein describe methods and systems for configuring adaptation layer of an IAB donor and IAB nodes in 5G communication networks. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for routing data by an integrated access and backhaul (IAB) donor communicating with a relaying node in a wireless communication system, the method comprising:
configuring a backhaul radio link control (RLC) channel by a central unit of the IAB donor;
configuring routing information included in a header of a packet in an adaptation layer, the packet mapped to the backhaul RLC channel, and the adaptation layer enabling data routing through a first backhaul link; and
transmitting, based on the routing information, the packet including the data for a user equipment to the relaying node, the relaying node supporting a wireless access link to the user equipment and a second backhaul link to another relaying node,
wherein the packet comprises user plane (UP) data or control plane (CP) data, and the UP data and the CP data are routed through different backhaul RLC channels.

2. The method of claim 1, wherein the relaying node and the another relaying node are IAB nodes, and
wherein each of the IAB donor and the IAB nodes include the adaptation layer.

3. The method of claim 1, wherein the routing information includes a routing ID associated with the adaptation layer of the relaying node.

4. The method of claim 1, wherein the header includes at least one of identification information of a destination relaying node, a path ID indicating a path which the packet is to be forwarded to the destination relaying node, and quality of service (QoS) related information.

5. An integrated access and backhaul (IAB) donor for communicating with a relaying node in a wireless communication system, the IAB donor comprising:
a memory; and
at least one processor coupled with the memory and configured to:
configure a backhaul radio link control RLC channel by a central unit of the IAB donor;
configure routing information included in a header of a packet in an adaptation layer, the packet mapped to the backhaul RLC channel, and the adaption layer enabling data routing through a first backhaul link; and
transmit, based on the routing information, the packet including the data for a user equipment to a relaying node, the relaying node supporting a wireless access link to the user equipment and a second backhaul link to another relaying node,
wherein the packet comprises user plane (UP) data or control plane (CP) data, and the UP data and the CP data are routed through different backhaul RLC channels.

6. The IAB Donor of claim 5, wherein the relaying node and the another relaying node are IAB nodes, and
wherein each of the IAB donor and the IAB nodes include the adaptation layer.

7. The IAB donor of claim 5, wherein the routing information includes a routing ID associated with the adaptation layer of the relaying node.

8. The IAB donor of claim 5, wherein the header includes at least one of identification information of a destination relaying node, a path ID indicating a path which the packet is to be forwarded to the destination relaying node, and quality of service (QoS) related information.

9. A method for routing data by a relaying node communicating with an integrated access and backhaul (IAB) donor or another relaying node in a wireless communication system, the method comprising:
obtaining, from the IAB donor, routing information included in a header of a packet in an adaptation layer, the packet mapped to a backhaul radio link control (RLC) channel configured by a central unit of the IAB donor, the adaptation layer enabling data routing through a first backhaul link; and
transmitting, based on the routing information, the packet including the data for a user equipment to the other relaying node or a user equipment, the relaying node supporting a wireless access link to the user equipment and a second backhaul link to the another relaying node,
wherein the packet comprises user plane (UP) data or control plane (CP) data, and the UP data and the CP data are routed through different backhaul RLC channels.

10. The method of claim 9, wherein the relaying node and the another relaying node are TAB nodes, and
wherein each of the IAB donor and the TAB nodes include the adaptation layer.

11. The method of claim 9, wherein the routing information includes a routing ID associated with the adaptation layer of the relaying node.

12. The method of claim 9, wherein the header includes at least one of identification information of a destination relaying node, a path ID indicating a path which the packet is to be forwarded to the destination relaying node, and quality of service (QoS) related information.

13. A relaying node for communicating with an integrated access and backhaul (IAB) donor or another relaying node in a wireless communication system, the relaying node comprising:
a memory; and
at least one processor coupled with the memory and configured to:
obtain, from the IAB donor, routing information included in a header of a packet in an adaptation layer, the packet mapped to a backhaul radio link control (RLC) channel configured by a central unit of the IAB donor, the adaptation layer enabling data routing through a first backhaul link;
transmit, based on the routing information, the packet including the data for a user equipment to the another relaying node or the user equipment, the relaying node supporting a wireless access link to the user equipment and a second backhaul link to the another relaying node,
wherein the packet comprises user plane (UP) data or control plane (CP) data, and the UP data and the CP data are routed through different backhaul RLC channels.

14. The relaying node of claim 13, wherein the relaying node and the another relaying node are IAB nodes, and
wherein each of the IAB donor and the IAB nodes include the adaptation layer.

15. The relaying node of claim 13, wherein the routing information includes a routing ID associated with the adaptation layer of the relaying node.

16. The relaying node of claim 13, wherein the header includes at least one of identification information of a destination relaying node, a path ID indicating a path which the packet is to be forwarded to the destination relaying node, and quality of service (QoS) related information.

* * * * *